(12) United States Patent
Song et al.

(10) Patent No.: US 9,221,328 B2
(45) Date of Patent: Dec. 29, 2015

(54) SYSTEM FOR HYBRID VEHICLE TO ENHANCE DRIVING PERFORMANCE DURING ELECTRIC MODE

(75) Inventors: Seong Jae Song, Seoul (KR); Tal Chol Kim, Incheon (KR); Sung Tae Cho, Gyeonggi-do (KR); Yong Gi Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 562 days.

(21) Appl. No.: 13/533,219

(22) Filed: Jun. 26, 2012

(65) Prior Publication Data

US 2013/0123063 A1    May 16, 2013

(30) Foreign Application Priority Data

Nov. 10, 2011    (KR) .................. 10-2011-0117203

(51) Int. Cl.
*F16H 37/06*    (2006.01)
*B60K 6/442*    (2007.10)
*B60K 6/387*    (2007.10)
*B60K 6/48*    (2007.10)

(52) U.S. Cl.
CPC ............... *B60K 6/442* (2013.01); *B60K 6/387* (2013.01); *B60K 2006/4808* (2013.01); *B60K 2006/4825* (2013.01); *Y02T 10/626* (2013.01); *Y02T 10/6234* (2013.01); *Y02T 10/6252* (2013.01); *Y10T 74/19051* (2015.01); *Y10T 477/26* (2015.01)

(58) Field of Classification Search
CPC .............................. B60K 9/442; B60K 6/387
See application file for complete search history.

(56) References Cited

U.S. PATENT DOCUMENTS 6,499,370 B2 * 12/2002 Bowen .......................... 74/330

FOREIGN PATENT DOCUMENTS

| JP | 2011031741 A | 2/2011 |
|----|--------------|--------|
| JP | 2011189798 A | 9/2011 |
| KR | 10-0986564 | 10/2010 |
| KR | 10-1028401 | 4/2011 |

* cited by examiner

*Primary Examiner* — Derek D Knight
(74) *Attorney, Agent, or Firm* — Mintz Levin Cohn Ferris Glovsky and Popeo, P.C.; Peter F. Corless

(57) ABSTRACT

Disclosed is system for a hybrid vehicle that includes an engine, a transmission, and a battery. The system may further include a first clutch configured to connect the engine with the transmission and having a first part and a second part; a first motor/generator configured to be connected to the first part and directly connected to the transmission; a second motor/generator configured to be connected to the second part; and a second clutch configured to connected the second motor/generator with the transmission. In particular, the first part and the second part may be clutches that can operate independently.

8 Claims, 2 Drawing Sheets

SYSTEM FOR HYBRID VEHICLE TO ENHANCE DRIVING PERFORMANCE DURING ELECTRIC MODE

CROSS-REFERENCE TO RELATED APPLICATION

This application claims priority to and the benefit of Korean Patent Application No. 10-2011-0117203 filed in the Korean Intellectual Property Office on Nov. 10, 2011, the entire contents of which are incorporated herein by reference.

BACKGROUND OF THE INVENTION (a) Field of the Invention

The present invention relates to a system for a hybrid vehicle that enhances driving performance during an electric vehicle mode compared with a conventional hybrid vehicle.

(b) Description of the Related Art

A hybrid vehicle is a vehicle that uses two or more distinct power sources to move the vehicle. The term most commonly refers to hybrid electric vehicles (HEVs), which combine an internal combustion engine and one or more electric motors powered by a battery. However, alternative forms of hybrid vehicles do exist, Hybrid Fuel cell vehicles.

Hybrid vehicles have become increasingly popular over the last couple of years due to their high fuel efficiency and low impact on the environment.

Generally, hybrid vehicles can be split into two distinct species, parallel type hybrids and series type hybrid. In a parallel hybrid one or more electric motors and an internal combustion engine are installed so that they can both individually or together power the vehicle. However in a series hybrid the vehicle is driven by the electric motor with no mechanical connection to the engine. Instead the engine is configured to run a generator when the battery pack energy supplied to the motor isn't or is being charged.

Recently, however, manufactures have begun to introduce another type of hybrid vehicle known as a plug-in hybrid vehicle (PHEV). In a PHEV, capacity of the battery is increased compared with a conventional hybrid batteries and the battery is charged via commercial electricity rather than by regenerative braking or a generator. Therefore, these vehicles allow a driver to operate the vehicle using just electrical energy (i.e., an EV mode) when driving short distances and operate the vehicle in a conventional HEV mode once the battery has been discharged.

Thus a PHEV can be driven by using both or either of the internal combustion engine and the electric motor depending upon how far the driver is driving. In these types of hybrid vehicles, a high-voltage battery which can be easily charged by electricity and typically having a large capacity is mounted in somewhere within the plug-in hybrid vehicle.

Because the hybrid vehicle are typically expect to perform much like conventional internal combustion vehicles, enhanced driving performance while in the electric vehicle mode is expected by consumers as well and thus, output capacity of the electric motor should be increased compared to a conventional hybrid vehicle.

In order to increase the output capacity of the electric motor, increase of material cost is often as a result unavoidable and total manufacturing cost resultantly increases, as well.

Particularly, since a clutch 1 is released during an electric vehicle mode, as shown in FIG. 1, a first motor/generator MG1 cannot be used as a power source like in a conventional hybrid system for providing drive power. Further, since the second motor/generator MG2 is in charge of providing the entire power output for driving the vehicle and the first motor/generator MG1 is used for engine starting and generating electricity during the EV mode only. Thus, sufficient driving performance cannot be guaranteed through the second motor/generator MG2 operating in the EV mode.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for a hybrid vehicle having advantages of enhancing driving performance while in an electric vehicle mode (EV mode) while at the same time reducing manufacturing costs.

A system for a hybrid vehicle according to an exemplary embodiment of the present invention includes an engine, a transmission, and a battery. The system may also include a first clutch configured to connect the engine with the transmission and having a first part and a second part; a first motor/generator configured to be connected to the first part and directly connected to the transmission; a second motor/generator configured to be connected to the second part; and a second clutch configured to connect the second motor/generator with the transmission. In particular, the first part and the second part may be clutches that can operate independently.

In one or more exemplary embodiments, the first part and the second part may be released and the second clutch may be engaged such that the first and second motor/generators are operated to drive a vehicle when the vehicle operates in an EV mode.

In one or more exemplary embodiments, the first part may be released in order for the vehicle to be driven via the first motor/generator, the second part may be engaged and the second clutch may be released so that the engine is started by the second motor/generator when the engine is started while the vehicle is operating in an EV mode.

In one or more exemplary embodiments, the first part may be engaged and the second part and the second clutch may be released so that the vehicle is driven by power from the engine and the first motor/generator when the vehicle is operating in a hybrid mode.

In one or more exemplary embodiments, the first part may be engaged, the second part may be released, and the second clutch may be engaged so that the vehicle is driven by power from the engine and the first and second motor/generators when the vehicle is operating in a hybrid mode. Furthermore, the first part may be released so that the first motor/generator generates electricity when regenerative braking is required.

In one or more exemplary embodiments, the first part may be released in order to for the first motor/generator to generate electricity and the second clutch may be engaged in order for the second motor/generator to generate electricity when regenerative braking is required as well.

BRIEF DESCRIPTION OF THE DRAWINGS

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DESCRIPTION OF SYMBOLS

Figure 1:
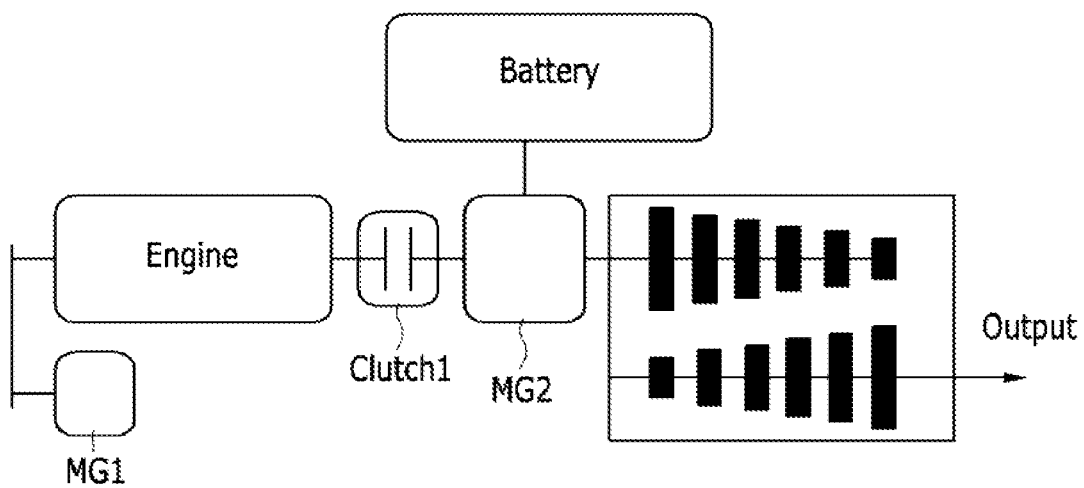
FIG. 1 is a schematic diagram of a conventional system for a hybrid vehicle.

100: system for hybrid vehicle
200: engine
300: transmission
400: battery
500: first clutch
510: first part
520: second part
600: first motor/generator
700: second motor/generator
800: second clutch It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In overall specification, in addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function or operation, and can be implemented by hardware components or software components and combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Exemplary embodiments of the present invention will hereinafter be described in detail with reference to the accompanying drawings.

Figure 2:
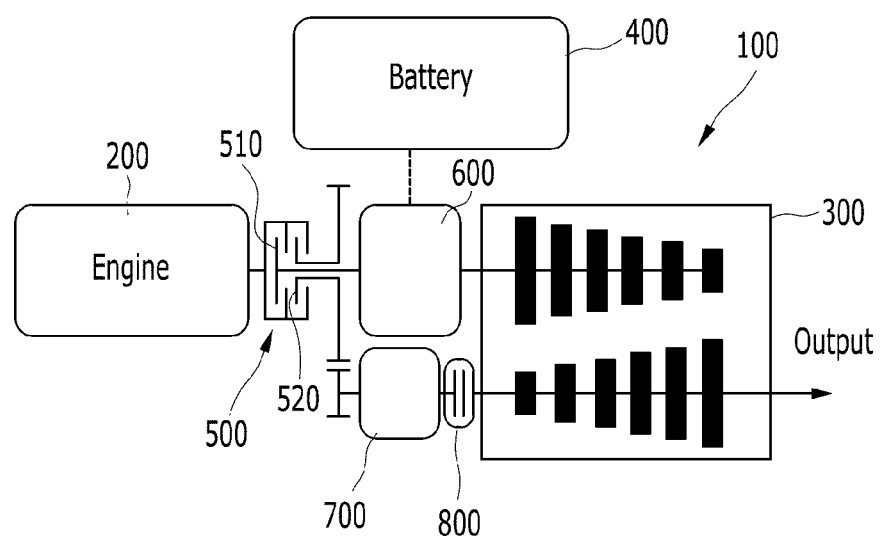
FIG. 2 is a schematic diagram of a system for a hybrid vehicle according to an exemplary embodiment of the present invention.

FIG. 2 is a schematic diagram of a system for a hybrid vehicle according to an exemplary embodiment of the present invention. As shown in FIG. 2, a system 100 for a hybrid vehicle according to an exemplary embodiment of the present invention includes an engine 200, a transmission 300, and a battery 400. In addition, the system 100 for the hybrid vehicle further includes a first clutch 500 connecting the engine 200 with the transmission 300 and having a first part 510 and a second part 520, a first motor/generator 600 connected to the first part 510 and directly connected to the transmission 300, a second motor/generator 700 connected to the second part 520, and a second clutch 800 selectively connecting the first motor/generator 700 with the transmission 300. Herein, the first part 510 and the second part 520 are constituent elements of the first clutch 500 and clutches that can operate independently.

The system 100 for the hybrid vehicle according to an exemplary embodiment of the present invention, particularly, can be applied to a plug-in hybrid vehicle (PHEV). The plug-in hybrid vehicle (PHEV) has a similar structure to that of a conventional hybrid vehicle, but a high-voltage battery having a large capacity is mounted in the plug-in hybrid vehicle. The high voltage battery 400 can be charged by electricity. Because the hybrid vehicle is required for enhancing driving performance at the electric vehicle mode, output capacity of the electric motor should be increased compared with a conventional hybrid vehicle.

The first clutch 500 connects the engine 200 with the transmission 300 selectively such that power of the engine 200 is delivered to the transmission 300 or not. Furthermore, the first clutch 500 according to an exemplary embodiment of the present invention, as shown in FIG. 2, is divided into the first part 510 and the second part 520. The first part 510 is connected to the first motor/generator 600 so as to selectively connect the engine 200 to the first motor/generator 600.

The first motor/generator 600 is directly connected to the transmission 300 such that power of the first motor/generator is delivered directly to the transmission 300. The first motor/generator 600 receives power from the battery 400, and generates electricity through regenerative braking and charges the battery 400 when the first part 510 is released.

Meanwhile, the second part 520 of the first clutch 500 is connected to the second motor/generator 700. In addition, the second motor/generator 700 is connected to the second clutch 800 additionally provided at a driven shaft of the transmission 300, and power of the second motor/generator 700 is delivered to the transmission 300 through the second clutch 800 when the second clutch 800 is engaged.

The second motor/generator 700 also receives power from the battery 400, and generates electricity via a driving torque of the engine 200 and charges the battery 400 when the first part 510 is engaged and the second clutch 800 is released.

The system 100 for the hybrid vehicle according to an exemplary embodiment of the present invention uses the first motor/generator 600 and the second motor/generator 700 simultaneously as power sources for driving the vehicle in an EV mode by delivering power from the second motor/generator 700 to the transmission 300 via the second clutch 800.

That is, unlike in the conventional art as shown in FIG. 1 which merely uses the first motor/generator MG1 is directly connected to the engine through, e.g., a belt to start the engine or generating electricity, the illustrative embodiment of the present invention is able to supply a driving output to a transmission TM via both the first and second motors/generators while the vehicle is in an EV mode.

That is, in a case of the system 100 for the hybrid vehicle according to an exemplary embodiment of the present invention, the second motor/generator 700 is connected to the transmission 300 by interposing the second clutch 800 therebetween so that power of the second motor/generator 700 can be delivered to the transmission 300 as shown in FIG. 2. Therefore, the belt connecting the engine with the first motor/generator MG1 according to the conventional art can be removed.

Since both of the first motor/generator 600 and the second motor/generator 700 can deliver power to the transmission 300 according to an exemplary embodiment of the present invention, driving performance during an EV mode may be enhanced compared with the conventional art.

In addition, since the second motor/generator 700 and the engine 200 are connected through the second part 520 as shown in FIG. 2, the engine 200 can be started by driving the second motor/generator 700 according to an exemplary embodiment of the present invention.

Hereinafter, an operation of the system 100 for the hybrid vehicle according to an exemplary embodiment of the present invention at each driving mode will be described in detail.

When the vehicle is operating in the electric vehicle (EV) mode, the system releases the first part 510 and the second part 520 of the first clutch 500 and engages the second clutch 800. The driving torque of the engine 200 is not delivered to the transmission 300 by releasing the first clutch 500, and driving torque of the first motor/generator 600 and the second motor/generator 700 is delivered to the transmission 300 as a result. Since driving torque is supplied by two motor/generators 600 and 700, driving performance at the electric vehicle mode may be enhanced.

To restart the engine while the vehicle is operating in the electric vehicle (EV) mode, the system releases the first part 510 and the second clutch 800 and engages the second part 520.

The engine 200 is disconnected from the transmission 300 by releasing the first part 510, and driving torque of the first motor/generator 600 only is delivered to the transmission 300. In addition, the second motor/generator 700 is disconnected from the transmission 300 by releasing the second clutch 800, and the second motor/generator 700 and the engine 200 are connected by engaging the second part 520. Therefore, the engine 200 can be started by power from the second motor/generator 700.

When the vehicle is operating in a hybrid mode, the system engages the first part 510 and releases the second part 520 and the second clutch 800. In this case, driving torque of the engine 200 is delivered to the transmission 300 due to engagement of the first part 510, and driving torque of the first motor/generator 600 is also delivered to the transmission 300 to thereby provide power to the transmission from both the engine 200 and the first motor/generator 600. At this time, the second part 520 and the second clutch 800 may be released. Therefore, driving torque from the second motor/generator 700 is not delivered to the transmission 300 during operation of the vehicle in the HEV mode.

Meanwhile, the system may engage the first part 510, release the second part 520, and engage the second clutch 800 while in the hybrid mode so that the driving torque from the engine 200 is delivered to the transmission 300 due to engagement of the first part 510, driving torque from the second motor/generator 700 due to engagement of the second clutch 800, and driving torque of the first motor/generator 600 is delivered to the transmission 300 as well. Therefore, in the above scenario, the hybrid vehicle is driven by the engine 200, the first motor/generator 600 and the second motor/generator 700.

When the vehicle brakes, the system releases the first part 510 to disconnect the engine 200 from the transmission 300 and the first motor/generator 600 generates electricity through regenerative braking. The battery 400 is charged by electricity generated by the first motor/generator 600.

In order to obtain a larger regenerative force when regenerative braking, the system releases the first part 510 in order for the first motor/generator 600 to generate electricity and engages the second clutch 800 in order for the second motor/generator 700 to also generate electricity. Generation of electricity by the first motor/generator 600 through regenerative braking is described above.

In addition, the second motor/generator 700 and the transmission 300 are connected by engaging the second clutch 800. Therefore, kinetic energy due to regenerative braking is delivered to the second motor/generator 700 through the transmission 300. The second motor/generator 700 generates electricity by using the kinetic energy, and the battery 400 is charged by electricity generated by the second motor/generator 700. Therefore, since the battery 400 is charged by using both of the first motor/generator 600 and the second motor/generator 700, a larger regenerative force may be achieved.

Advantageously, since the first motor/generator and the second motor/generator can deliver driving torque to the transmission according to an exemplary embodiment of the present invention, driving performance at the electric vehicle mode may be enhanced. Furthermore, since additional developmental cost and material cost are not required for increasing output capacity of the electric motor according to an exemplary embodiment of the present invention, manufacturing cost may be reduced as well.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for a hybrid vehicle having an engine, a transmission, and a battery, comprising:
    a first clutch configured to selectively connect the engine with the transmission and having a first part and a second part;
    a first motor/generator selectively connected to the engine through the first part of the first clutch and having a first driving shaft;
    a second motor/generator selectively connected to the engine through the second part of the first clutch and having a second driving shaft; and
    a second clutch configured to selectively connect the second motor/generator with the transmission,
    wherein the first part and the second part are clutches that can operate independently of each other within the first clutch,
    the transmission comprises a first shaft having a first central axis and a second shaft having a second central axis displaced from the first central axis, the second shaft outputting a driving force from the transmission,
    the first driving shaft of the first motor/generator is directly connected to the first shaft of the transmission, and
    the second clutch is installed between the second driving shaft of the second motor/generator and the second shaft of the transmission to selectively connect the second driving shaft with the second shaft.

2. The system of claim 1, wherein the first part and the second part are released and the second clutch is engaged so that the first and second motor/generators are provide power to the transmission when the hybrid vehicle is in an electric mode (EV mode).

3. The system of claim 1, wherein the first part is released in order for the vehicle to be driven by the first motor/generator, the second part is engaged and the second clutch is released so that the engine is started by the second motor/generator when the engine is started while the vehicle is operating in EV mode.

4. The system of claim 1, wherein the first part is engaged and the second part and the second clutch are released so that the vehicle is driven by power from the engine and the first motor/generator when the hybrid vehicle is operating in a hybrid mode.

5. The system of claim 1, wherein the first part is engaged, the second part is released, and the second clutch is engaged so that the vehicle is driven by power from the engine and the first and second motor/generators when the hybrid vehicle is operating in a hybrid mode.

6. The system of claim 1, wherein the first part is released so that the first motor/generator generates electricity when regenerative braking.

7. The system of claim 1, wherein the first part is released to generate electricity by the first motor/generator and the second clutch is engaged to generate electricity by the second motor/generator when regenerative braking.

8. A power train for a hybrid vehicle, the power train comprising:
   a first clutch configured to selectively connect an engine with a transmission, wherein the first clutch includes a first part and a second part;
   a first motor/generator selectively connected to the engine through the first part of the first clutch and having a first driving shaft;
   a second motor/generator selectively connected to the engine through to the second part of the first clutch and having a second driving shaft; and
   a second clutch configured to selectively connect the second motor/generator with the transmission, wherein the second clutch connects the second motor/generator to the transmission while the vehicle is operating in an electric vehicle mode,
   wherein the first part and the second part are clutches that can operate independently of each other within the first clutch,
   the transmission comprises a first shaft having a first central axis and a second shaft having a second central axis displaced from the first central axis, the second shaft outputting a driving force from the transmission,
   the first driving shaft of the first motor/generator is directly connected to the first shaft of the transmission, and
   the second clutch is installed between the second driving shaft of the second motor/generator and the second shaft of the transmission to selectively connect the second driving shaft with the second shaft.

* * * * *